Patented Oct. 15, 1940

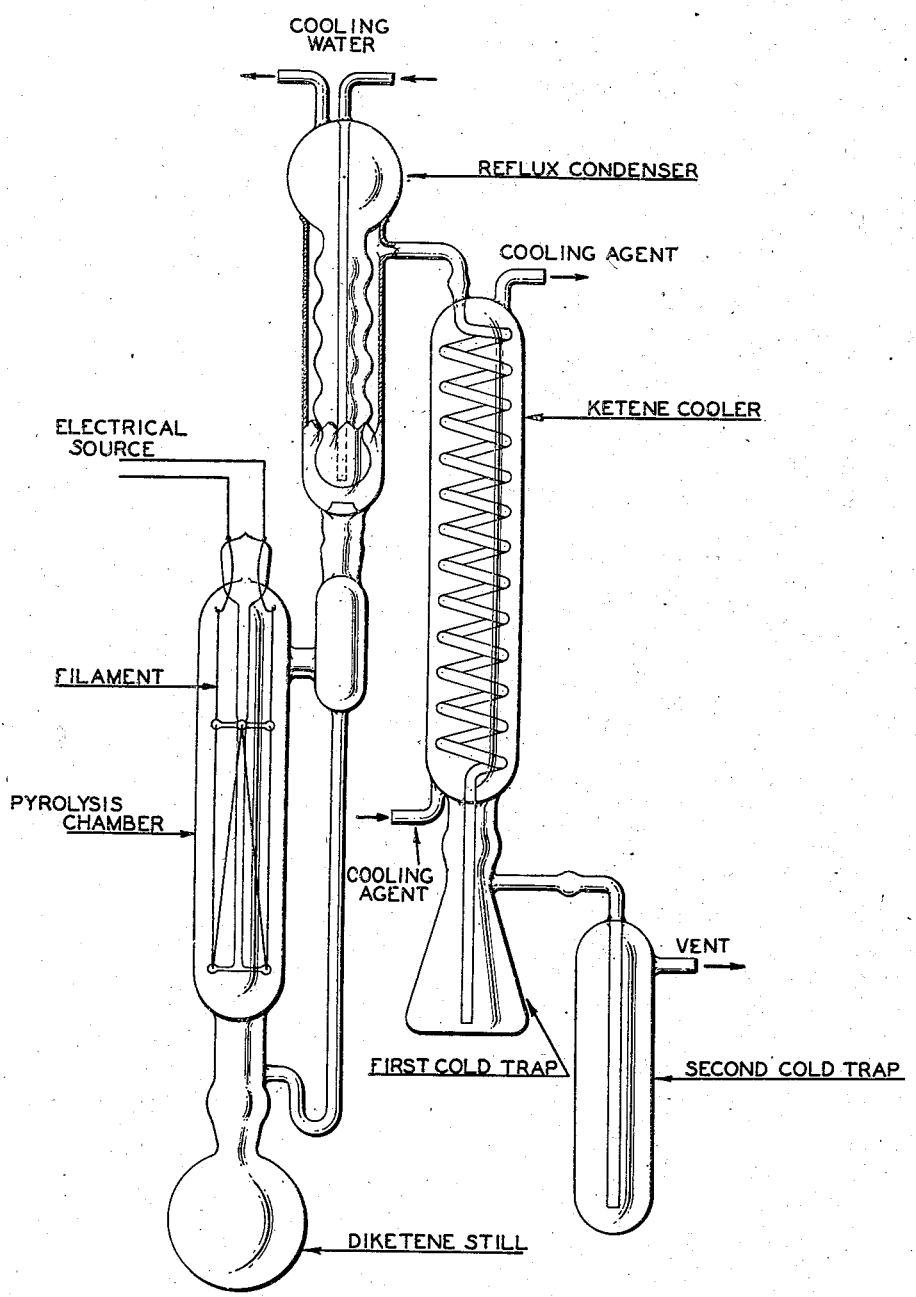

2,218,066

UNITED STATES PATENT OFFICE 2,218,066

METHOD FOR THE PREPARATION OF KETENE

Albert B. Boese, Jr., Pittsburgh, Pa., assignor to Carbide and Carbon Chemicals Corporation, a corporation of New York Application January 21, 1937, Serial No. 121,569

7 Claims. (Cl. 260—550)

This invention relates to a process for the preparation of ketene, a highly reactive substance of sharp, acrid odor, which is normally gaseous, boiling at —56° C., and having the formula $CH_2:C:O$. Broadly, the process comprises the pyrolysis of dimeric ketene into monomeric ketene, which may be subsequently condensed and purified by some suitable means. The terms ketene as used throughout this specification and the appended claims, indicates only the substance $CH_2:C:O$, while diketene will be understood to designate the dimer, $(CH_2:CO)_2$, whether the latter is assumed to exist as acetylketene $(CH_3.CO.CH:CO)$, or as beta crotonolactone

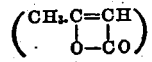

or in other configuration. More specifically, the new process may be accomplished by passing the vapors of diketene through a heated tube, or by bringing said vapors in contact with a heated filament, such as a platinum wire, whereby the diketene by pyrolysis, is depolymerized to ketene. In the former method, an inert diluent, such as nitrogen may be admixed with the vapors of diketene. Where a heated filament is employed, the pyrolysis of diketene may be equally well accomplished without the use of an inert diluent. The temperature of the heated chamber or of the heated filament may be maintained at from 400° to about 800° C. to effect pyrolysis, and temperatures of from about 500° to about 700° C. are preferred.

Diketene may be vaporized under atmospheric or reduced pressure by raising the liquid to its boiling temperature. When large quantities of diketene are to be pyrolized, flash evaporation, either by slowly introducing the liquid into a heated vessel or by dropping the diketene into a high boiling, inert solvent, maintained above the boiling point of the diketene, is desirable. An example of a suitable high boiling inert liquid for this purpose is tetraethylene glycol dimethyl ether.

This invention provides a convenient and economical process for the preparation of pure monomeric ketene in any desired quantity. It likewise furnishes a method for converting diketene, which may be a by-product in the production of ketene by the pyrolysis of acetone, to ketone, thereby increasing the efficiency of the original process.

The following examples illustrate methods of practicing the invention:

Example I

Gaseous diketene was passed into a pyrolysis unit comprising a reflux system in which was suspended a platinum wire or platinum gauze heated to a temperature of from about 600° to about 700° C. by an electric current of 5.0 amperes. The outlet from this system was connected to a condenser and two cold traps placed in series. The first of these was cooled by ice, and served to collect any unchanged diketene. The second was refrigerated by a mixture of acetone and solid carbon dioxide, and served to liquefy the ketene produced. The attached drawing illustrates an assembly of apparatus which may be used for carrying out the process of this example.

The reaction was carried out by refluxing 100 parts by weight of the diketene at atmospheric pressure, the ensuing vapors passing over the heated platinum wire. The diketene depolymerized rapidly and smoothly, refluxing being maintained for about 25 minutes. The overall yield of ketene in the second cold trap was 55.5 parts by weight, while 38.5 parts by weight of unchanged diketene were collected in the first cold trap. About 5.6 parts by weight of material remained in the reflux chamber as a residue, and this consisted mostly of higher ketene polymers. The efficiency of the process was found to be 99.3%. The product obtained in the second cold trap was identified as ketene by allowing it to vaporize through an ethereal solution of aniline, whereupon a nearly quantitive yield of acetanilide was obtained.

Example II

In this case the pyrolysis chamber was a heat resisting glass tube, electrically heated to a temperature of from about 500° to about 600° C., and connected to a still kettle provided with a gas inlet tube. The effluent vapors were passed from the top of the pyrolysis tube through a condenser, and into a system of cold traps similar to that described in the previous example.

The still kettle was charged with 100 parts by weight of diketene, which was refluxed for 75 minutes at atmospheric pressure. During this time a slow stream of nitrogen was passed through the system. Nineteen and one-half parts by weight of diketene were condensed in the first cold trap, while 8.8 parts by weight of diketene polymers remained in the still. Sixty four parts by weight of ketene were condensed in the second cold trap, indicating an efficiency of 89.2% for the process.

It was found by experimentation that where large amounts of diketene are to be pyrolized, the method outlined in Example II may be used, but in the pyrolysis of small amounts of diketene the process described in Example I is preferable.

This invention is by no means limited to operations as in the examples described, and it is apparent that the process may be varied considerably. For example, metals or materials other than platinum that may be used as pyrolysis chambers, or filaments, are tungsten, and various heat-resistant ferrous and non-ferrous alloys. Among the heat-resistant ferrous alloys that may be suitably employed are the chromium-nickel steels, for example the austenitic steels containing from about 15% to about 35% chromium, and from about 6% to about 25% nickel. Heat-resistant non-ferrous alloys suitable as filaments or metal tubes are the alloys consisting chiefly of chromium and nickel, and which may contain minor amounts of other elements, such as iron. Still other alloys that may be employed in place of platinum are the nickel-copper alloys similar to "Monel metal," and nickel-molybdenum-iron alloys of the type described, for example, in Patent 1,710,445 to Frederick M. Becket.

The range of temperatures used may also be varied depending upon the types of filaments or tubes used, but in general temperatures of from about 500° to about 700° C. are most suitable. Various inert gases such as carbon dioxide, carbon monoxide and methane, could be substituted for nitrogen, and by varying the rate of flow of the gas, the yield of ketene may be controlled within rather wide limits. Various pressures both above and below atmospheric pressure may be employed in the pyrolysis of diketene, and these influence to a certain extent the production of ketene. Other modifications which will not materially alter the process will be apparent, and such modifications are included within the scope of the invention as defined by the appended claims.

I claim:

1. Process for preparing ketene which essentially comprises subjecting vapors of diketene to pyrolysis at temperatures between about 400° and about 800° C. to depolymerize the diketene and form a gaseous mixture containing monomeric ketene.

2. Process for preparing ketene which essentially comprises forming a mixture of diketene vapor with an inert gas and subjecting the diketene vapor in said mixture to pyrolysis at temperatures between about 400° and about 800° C. to depolymerize the diketene and form a gaseous mixture containing monomeric ketene.

3. Process for preparing ketene which essentially comprises subjecting vapors of diketene to pyrolysis in contact with a metal filament heated to a temperature between about 400° and about 800° C. to depolymerize the diketene and form a gaseous mixture containing monomeric ketene.

4. Process for preparing ketene which essentially comprises passing vapors of diketene through a pyrolysis chamber at temperatures between about 400° and about 800° C. to depolymerize the diketene and form a gaseous mixture containing monomeric ketene.

5. Process for preparing ketene which essentially comprises passing a mixture of diketene vapor with an inert gas through a pyrolysis chamber at temperatures between about 500° and about 700° C. to depolymerize the diketene and form a gaseous mixture containing monomeric ketene.

6. Process for preparing ketene which essentially comprises subjecting vapors of diketene to pyrolysis in contact with a metal filament heated to a temperature between about 600° and about 700° C. to depolymerize the diketene and form a gaseous mixture containing monomeric ketene.

7. Process for preparing ketene which essentially comprises passing a mixture containing diketene vapor and nitrogen through a pyrolysis chamber at temperatures between about 500° and about 700° C. to depolymerize the diketene and form a gaseous mixture containing monomeric ketene.

ALBERT B. BOESE, Jr.